United States Patent
Moorman

(10) Patent No.: US 12,448,933 B2
(45) Date of Patent: Oct. 21, 2025

(54) SYSTEMS AND METHODS FOR INTELLIGENT DIAGNOSTIC SCREENING OF HYBRID GENERATOR SYSTEMS

(71) Applicant: Moser Energy Systems, Evansville, WY (US)

(72) Inventor: Darrin Moorman, Johnstown, CO (US)

(73) Assignee: Moser Engine Service, Inc., Evansville, WY (US)

( * ) Notice: Subject to any disclaimer, the term of this patent is extended or adjusted under 35 U.S.C. 154(b) by 0 days.

(21) Appl. No.: 18/884,512

(22) Filed: Sep. 13, 2024

(65) Prior Publication Data

US 2025/0264070 A1    Aug. 21, 2025

Related U.S. Application Data

(60) Provisional application No. 63/555,355, filed on Feb. 19, 2024.

(51) Int. Cl.
*F02D 41/22* (2006.01)
*F02B 63/04* (2006.01)

(52) U.S. Cl.
CPC .............. *F02D 41/22* (2013.01); *F02B 63/04* (2013.01); *F02D 2200/0625* (2013.01); *F02D 2200/503* (2013.01)

(58) Field of Classification Search
CPC . F02B 77/08; F02B 77/085; H02J 7/00; H02J 7/0069; F02D 41/02; F02D 25/04; F02D 41/26; F02D 41/24; F02D 2041/1412; F02D 41/14; F02D 41/22; F02D 2041/224; F02D 2200/00; F02D 2200/0625;
(Continued)

(56) References Cited

U.S. PATENT DOCUMENTS 8,538,626 B2 * 9/2013 Kumar ................ B60W 20/50
123/406.27
8,612,079 B2 12/2013 Tang et al.
(Continued)

FOREIGN PATENT DOCUMENTS

CN    113246959 A  *  8/2021  ............ B60W 10/06
CN    113464274 A     10/2021
(Continued)

OTHER PUBLICATIONS

International Search Report and Written Opinion issued by the International Searching Authority for related International Application No. PCT/US2025/016280, mailed Jun. 5, 2025, 11 pages.

*Primary Examiner* — Lindsay M Low
*Assistant Examiner* — Teuta B Holbrook
(74) *Attorney, Agent, or Firm* — HAYNES AND BOONE, LLP

(57) ABSTRACT

Systems and methods for evaluating an engine associated with a hybrid power system, including initiating a load step on the engine using a battery of the hybrid power system, measuring a plurality of parameters associated with a response of the engine to the load step using a plurality of sensors, comparing the measured parameters associated with the response of the engine to baseline performance data associated with the engine, and calculating an engine performance score for the engine based on the comparison of the measured parameters to the baseline performance data.

20 Claims, 12 Drawing Sheets

(58) Field of Classification Search
CPC .......... F02D 2200/06; F02D 2200/503; G05B 23/02; G05B 23/00; G05B 23/0283; B60W 10/08; B60W 10/06; B60W 10/04; H02K 99/10
USPC .............. 701/1, 537, 102, 22; 903/903; 123/179.1, 179.3, 406.53; 290/40 C, 290/40 F, 40 R, 47
See application file for complete search history.

(56) References Cited

U.S. PATENT DOCUMENTS

| | | | |
|---|---|---|---|
| 9,260,976 | B2 | 2/2016 | Phillips et al. |
| 9,472,954 | B2* | 10/2016 | Piyabongkarn ........... H02J 3/46 |
| 9,869,665 | B2 | 1/2018 | Chapman, III |
| 9,885,250 | B2 | 2/2018 | James |
| 10,126,206 | B2 | 11/2018 | Bizub |
| 10,442,547 | B2 | 10/2019 | Miller et al. |
| 10,608,564 | B1 | 3/2020 | Johnson et al. |
| 11,454,569 | B2 | 9/2022 | Smart et al. |
| 11,697,424 | B2 | 7/2023 | Choe et al. |
| 2009/0309416 | A1 | 12/2009 | Bose et al. |
| 2016/0061173 | A1 | 3/2016 | Chuah et al. |
| 2018/0001985 | A1* | 1/2018 | Zhang ..................... F02D 29/02 |
| 2019/0296680 | A1* | 9/2019 | Das ....................... H02P 29/032 |
| 2020/0072137 | A1* | 3/2020 | Cai .......................... F02D 25/02 |
| 2020/0251910 | A1* | 8/2020 | Moorman ................. H02J 7/34 |
| 2021/0245607 | A1* | 8/2021 | Zhang ..................... G05F 1/66 |
| 2021/0371132 | A1* | 12/2021 | Ip .............................. F02C 6/20 |
| 2022/0155772 | A1* | 5/2022 | Charbonnel ....... G05B 23/0283 |
| 2023/0039760 | A1 | 2/2023 | Mccarthy et al. |
| 2023/0198295 | A1* | 6/2023 | Wyman .................. E21B 41/00 166/65.1 |

FOREIGN PATENT DOCUMENTS

| | | | | |
|---|---|---|---|---|
| CN | 117382607 A | * | 1/2024 | ......... B60K 6/46 |
| DE | 102018126501 B3 | | 12/2019 | |
| DE | 102017122057 B4 | | 2/2023 | |
| EP | 2989436 B1 | | 6/2017 | |
| EP | 3865335 A1 | | 8/2021 | |

* cited by examiner

| PARAMETER | SCALE | READING | COMPOSITE SCORE |
|---|---|---|---|
| TPS | 1 TO 10 | 7 | 5.9 |
| IAT | 1 TO 10 | 6 | |
| MAP | 1 TO 10 | 6 | |
| TIP | 1 TO 10 | 6 | |
| CCP | 1 TO 10 | 5 | |
| ECT | 1 TO 10 | 5 | |
| VIB | 1 TO 10 | 6 | |
| FF | 1 TO 10 | 5 | |
| EGT | 1 TO 10 | 6 | |
| RR | 1 TO 10 | 7 | |

FIG. 4

505 — 5,000 HOURS

| PARAMETER | SCALE | READING | COMPOSITE SCORE |
|---|---|---|---|
| TPS | 1 TO 10 | 7 | 5.9 |
| IAT | 1 TO 10 | 6 | |
| MAP | 1 TO 10 | 6 | |
| TIP | 1 TO 10 | 6 | |
| CCP | 1 TO 10 | 5 | |
| ECT | 1 TO 10 | 5 | |
| VIB | 1 TO 10 | 6 | |
| FF | 1 TO 10 | 5 | |
| EGT | 1 TO 10 | 6 | |
| RR | 1 TO 10 | 7 | |

FIG. 5A

510 — 10,000 HOURS

| PARAMETER | SCALE | READING | COMPOSITE SCORE |
|---|---|---|---|
| TPS | 1 TO 10 | 8 | 7.0 |
| IAT | 1 TO 10 | 7 | |
| MAP | 1 TO 10 | 7 | |
| TIP | 1 TO 10 | 8 | |
| CCP | 1 TO 10 | 7 | |
| ECT | 1 TO 10 | 7 | |
| VIB | 1 TO 10 | 7 | |
| FF | 1 TO 10 | 6 | |
| EGT | 1 TO 10 | 6 | |
| RR | 1 TO 10 | 7 | |

FIG. 5B

515 — 20,000 HOURS

| PARAMETER | SCALE | READING | COMPOSITE SCORE |
|---|---|---|---|
| TPS | 1 TO 10 | 9 | 8.0 |
| IAT | 1 TO 10 | 8 | |
| MAP | 1 TO 10 | 8 | |
| TIP | 1 TO 10 | 8 | |
| CCP | 1 TO 10 | 8 | |
| ECT | 1 TO 10 | 7 | |
| VIB | 1 TO 10 | 8 | |
| FF | 1 TO 10 | 8 | |
| EGT | 1 TO 10 | 7 | |
| RR | 1 TO 10 | 9 | |

FIG. 5C

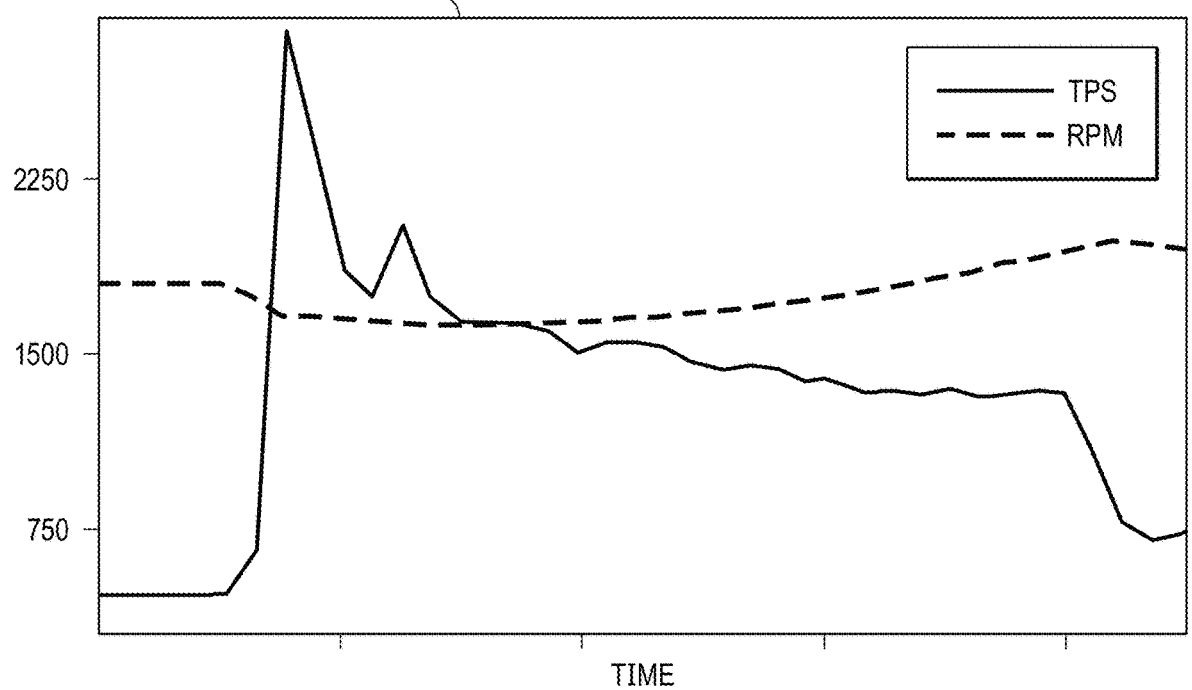

SYSTEMS AND METHODS FOR INTELLIGENT DIAGNOSTIC SCREENING OF HYBRID GENERATOR SYSTEMS

CROSS-REFERENCE TO RELATED APPLICATION

This application claims priority to and the benefit of the filing date of U.S. Provisional Patent Application No. 63/555,355, filed Feb. 19, 2024, the entire disclosure of which is hereby incorporated herein by reference.

FIELD OF THE DISCLOSURE

The present disclosure generally relates to systems and methods for intelligent diagnostic screening of engine-driven power systems. More particularly, to systems and methods for intelligent diagnostic screening of the health and performance of an engine-driven power system in a hybrid generator system.

BACKGROUND

There is an ever-increasing demand for power to support a variety of industry applications, including military applications where power is needed to support communications, surveillance, armament, mobility, medical treatment, and providing the necessities such as food and shelter. This ever-increasing demand for power presents critical logistical support challenges, which become even more challenging as the distances between central supply bases and areas of operation increase.

With respect to military applications and other contested environments, the need for efficient and reliable utilization of resources is especially critical. Two of the most common terms used to describe the logistical needs of modern warfare are "precision sustainment" and "predictive logistics." When applied to fuel and power systems, these terms necessitate that every drop of fuel and every piece of equipment be managed to the highest levels of efficiency and effectiveness. Equipment nearing the end of its service life and compromised equipment with degraded performance and poor fuel efficiency cannot be sustained where that equipment is vital to the mission of the user. Such equipment also cannot be sustained in environments exposed to high levels of risk and in environments where it is cost prohibitive to transport such equipment.

Hybrid power systems (e.g., combining engine-driven power systems with energy storage) have greatly enhanced the reliability, resiliency, and efficacy of modern power systems and are being deployed and utilized in a wide variety of applications, not just military applications. Regardless of the application, maintaining the components of the power system at the highest levels of efficiency and effectiveness is crucial for the performance of the power system as a whole and for the performance of the operation. Thus, systems and methods for monitoring and evaluating the performance of components, such as the engine-driven power system of a hybrid power system, in order to assess the health of the system and predict future maintenance, overhauls, and end-of-life, would be an improvement to the technical field of hybrid power systems.

BRIEF DESCRIPTION OF THE DRAWINGS

FIG. 4 illustrates a table of engine performance scores calculated for the generator during the method of FIG. 3, according to one or more embodiments of the present disclosure;

FIGS. 5A, 5B, and 5C illustrate other tables of engine performance scores calculated for the generator during the method of FIG. 3, according to one or more embodiments of the present disclosure;

FIGS. 6-8 illustrate measurements of a plurality of parameters associated with a response of the generator to the IDS test performed by the method of FIG. 3, according to one or more embodiments of the present disclosure;

DETAILED DESCRIPTION

Figure 1:
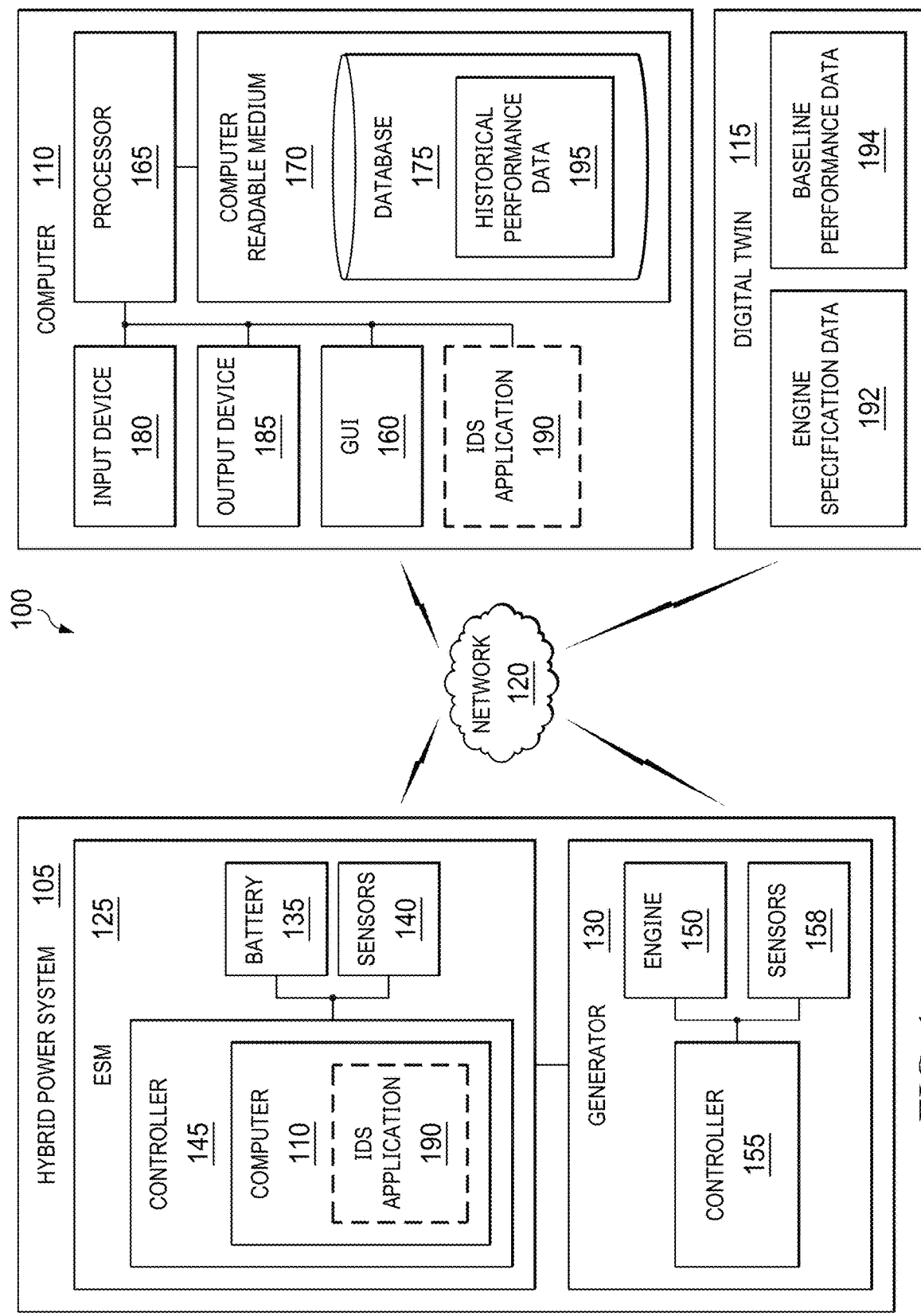
FIG. 1 illustrates an intelligent diagnostic screening ("IDS") system, including a hybrid power system and a computer, according to one or more embodiments of the present disclosure.

The following disclosure provides many different embodiments. Specific examples of components and arrangements are described below to simplify the present disclosure. These are, or course, merely examples and are not intended to be limiting. In addition, the present disclosure may repeat reference numerals and/or letters in the various embodiments. This repetition is for the purpose of simplicity and clarity and does not in itself dictate a relationship between the various embodiments and/or configurations discussed.

The systems and methods disclosed herein provide improvements to the use of hybrid power systems and to the deployment, servicing, and support of such power systems and the critical resources associated therewith. By utilizing sophisticated sensors associated with the hybrid power system and applying the methods of the present disclosure, including enhanced predictive logistics, precision sustainment of the components of the hybrid power system is achieved.

FIG. 1 illustrates an example intelligent diagnostic screening ("IDS") system 100 that includes a hybrid power system 105 that is in communication with a computer 110 and a digital twin 115 via a network 120.

As illustrated, the hybrid power system 105 includes an energy storage module ("ESM") 125 and a generator 130 configured to serve as the primary source of power in the hybrid power system 105. The ESM 125 includes one or more batteries 135, a plurality of sensors 140, and a controller 145 operably coupled together. Generally, the one or more batteries 135 is configured to store power and supply power to the various resources associated with the operation in which the hybrid power system 105 is deployed.

The generator 130 is operably coupled to the ESM 125 and includes an engine 150, a generator controller 155, and a plurality of sensors 158. The plurality of sensors 158, the engine controller 155, and the engine 150 are operably coupled together. In one or more embodiments, the engine 150 is a gas-powered internal combustion engine and the plurality of sensors 158 are integrated with the engine 150 by the manufacturer of the engine 150. In other embodiments, the plurality of sensors 158 are retrofitted to the engine 150. In some embodiments, the manufacturer of the engine 150 may not enable a user to access and utilize the factory original sensors, necessitating the need for the retrofit to add the plurality of sensors 158. The plurality of sensors 158 monitor or measure specific parameters associated with the engine 150 or a performance of the engine 150. The plurality of sensors 158 may include: (i) an engine coolant temperature ("ECT") sensor that measures/indicates the amount of thermal energy absorbed into the engine coolant; (ii) a throttle inlet pressure ("TIP") sensor that measures/indicates the relative pressure on the supply side of the engine's throttle plate; (iii) a manifold absolute pressure ("MAP") sensor that measures/indicates the mass air flow in the engine's induction system; (iv) a throttle position sensor ("TPS") that measures/indicates the relative position of the throttle device in response to the load command; (v) an intake air temperature ("IAT") sensor that measures/indicates the temperature of the induction air used in combustion; (vi) a fuel flow ("FF") sensor that measures/indicates the amount of fuel being delivered to the engine to support the commanded load; (vii) an oil pressure ("OP") sensor that measures/indicates the pressure of the lubricating oil in the engine lube system; (viii) an exhaust gas temperature ("EGT") sensor that measures/indicates the temperature of the combustion gases after exiting the combustion chamber; (ix) a vibration ("Vib") sensor that measures/indicates the magnitude, frequency, and oscillatory direction in the engine; and (x) a crank case pressure ("CCP") sensor that measures/indicates the pressure of the crankcase gases.

In some embodiments, the engine 150 of the generator 130 provides all or a majority of the power output from the hybrid power system 105 during normal, relatively high-power demand cycles and the one or more batteries 135 of the ESM 125 provide all or a majority of the power during periods of reduced power demand. The one or more batteries 135 can also provide supplemental power to supplement the power provided by the engine 150 during peak loading at the lower and upper edges of the connected load profile, which can significantly improve peak load capability or reduce a required size of the generator for applications with relatively high peak loads and much lower normal operating loads. This provides a means to improve efficiency, reduce fuel consumption, and/or operate in "stealth mode" with a much lower heat and noise signature. The ability of the ESM 125 to supplement the power of the generator 130 provides smoother responses to increases in load as the engine 150 of the generator 130 "throttles-up" to meet the demands of the increased load, improves fuel efficiency by as much as 90%, and enables a more robust response to loading and unloading events.

While only one generator 130 is illustrated in FIG. 1, the hybrid power system 105 may include a plurality of generators coupled to the ESM 125. In such embodiments, one of the plurality of generators may be selected to be the primary power source such that the selected generator is the first generator activated to satisfy a demand for power while the additional generators are sequentially activated to share the load as needed. In one or more embodiments, additional sources of power may be connected to the ESM 125 to supplement the battery and engine-driven power supplies. These additional power sources may include a pre-existing grid or renewable energy-based power sources, including, for example, wind turbines, solar panels, and hydroelectric dams.

With continued reference to FIG. 1, the computer 110 includes a graphical user interface ("GUI") 160, a processor 165, and a computer readable medium 170 coupled thereto. Instructions accessible to, and executable by, the processor 165 are stored on the computer readable medium 170. A database 175 is also stored in the computer readable medium 170. Generally, the GUI 160 can display a plurality of windows or screens to a user. The computer 110 also includes an input device 180 and an output device 185. In one or more embodiments, the input device 180 and the output device 185 are the GUI 160. In one or more embodiments, the user provides inputs to the IDS system 100 via a window that is displayed on the GUI 160. However, in one or more other embodiments, the input device 180 may also be a microphone and the output device 180 may be a speaker. In several embodiments, the computer 110 is, or includes, a telephone, a personal computer, a personal digital assistant, a cellular telephone or mobile phone, other types of telecommunications devices, other types of computing devices, and/or any combination thereof. In several embodiments, the computer 110 includes a plurality of remote user devices. In some embodiments, the computer 110 further includes an IDS application 190 executable using the processor 165 of the computer 110. In one or more embodiments, the IDS application 190 may be stored on the computer readable medium 170 of the computer 110. As will be discussed in more detail below, the IDS application 190 is configured to be used to test the health and performance of the engine 150 of the generator 130 using the ESM 125.

In some embodiments, the database 175 stored in the computer readable medium 170 of the computer 110 includes historical performance data 195 associated with the results of the tests performed on the engine 150 of the generator 130 using the IDS application 190 and the ESM 125. In one or more embodiments, the historical performance data 195 may include engine performance scores calculated using the computer 110 and associated with the health and performance of the engine 150.

In one or more embodiments, the computer 110 is positioned remotely relative to the hybrid power system 105. In one or more other embodiments, the computer 110 is positioned locally relative to the ESM 125 of the hybrid power system 105. In such embodiments, the controller 145 of the ESM 125 may include the computer 110. In still other embodiments, the IDS system 100 may include two or more computers, such as computer 110, with one positioned locally relative to the ESM 125 and the other positioned remotely relative to the hybrid power system 105. In such embodiments, the IDS application 190 may be stored on the computer 110 positioned locally relative to the ESM 125, on the computer 110 positioned remotely relative to the hybrid power system 105, or may be shared between the two or more computers. Thus, the IDS application 190 can be communicated to, stored on, and/or executed by the controller 145 of the ESM 125.

In some embodiments, the digital twin 115 is associated with the engine 150 of the generator 130 and includes engine specification data 192 and baseline performance data 194 associated with the engine 150 of the generator 130. In one or more embodiments, the IDS system 100 may include a catalog or library of a plurality of digital twins associated with a plurality of engines of a plurality of generators. Each engine of each respective generator of the plurality of generators may be associated with a respective digital twin.

In one or more embodiments, the digital twin 115 may be originally stored on the engine controller 155 of the generator 130. In such embodiments, the digital twin 115 is accessed by the controller 145 of the ESM 125 when the generator 130 is connected to the ESM 125. In one or more other embodiments, the digital twin 115 may be originally stored remotely relative to the generator 130 and the ESM 125. In such embodiments, the digital twin 115 may be stored in a database or cloud storage system associated with the manufacturer of the engine 150 such that the digital twin 115 may be accessed by the controller 145 of the ESM 125 via the network 120 by accessing a manufacturer website or by directly accessing the database or cloud storage system associated with the manufacturer.

In one or more embodiments, once the controller 145 of the ESM 125 has accessed the digital twin 115, the digital twin 115 may be stored locally on the controller 145 of the ESM 125. In one or more other embodiments, once the controller 145 of the ESM 125 has accessed the digital twin 115, the digital twin 115 may be stored remotely relative to the ESM 125 but in communication with the controller 145 of the ESM 125 via the network 120.

In one or more embodiments, the network 120 includes the Internet, one or more local area networks, one or more wide area networks, one or more cellular networks, one or more wireless networks, one or more voice networks, one or more data networks, one or more communication systems, and/or any combination thereof. In some embodiments, the network 120 also includes WIFI, Bluetooth, and Long-Term Evolution ("LTE") or other wireless broadband communication technology.

Figure 2:
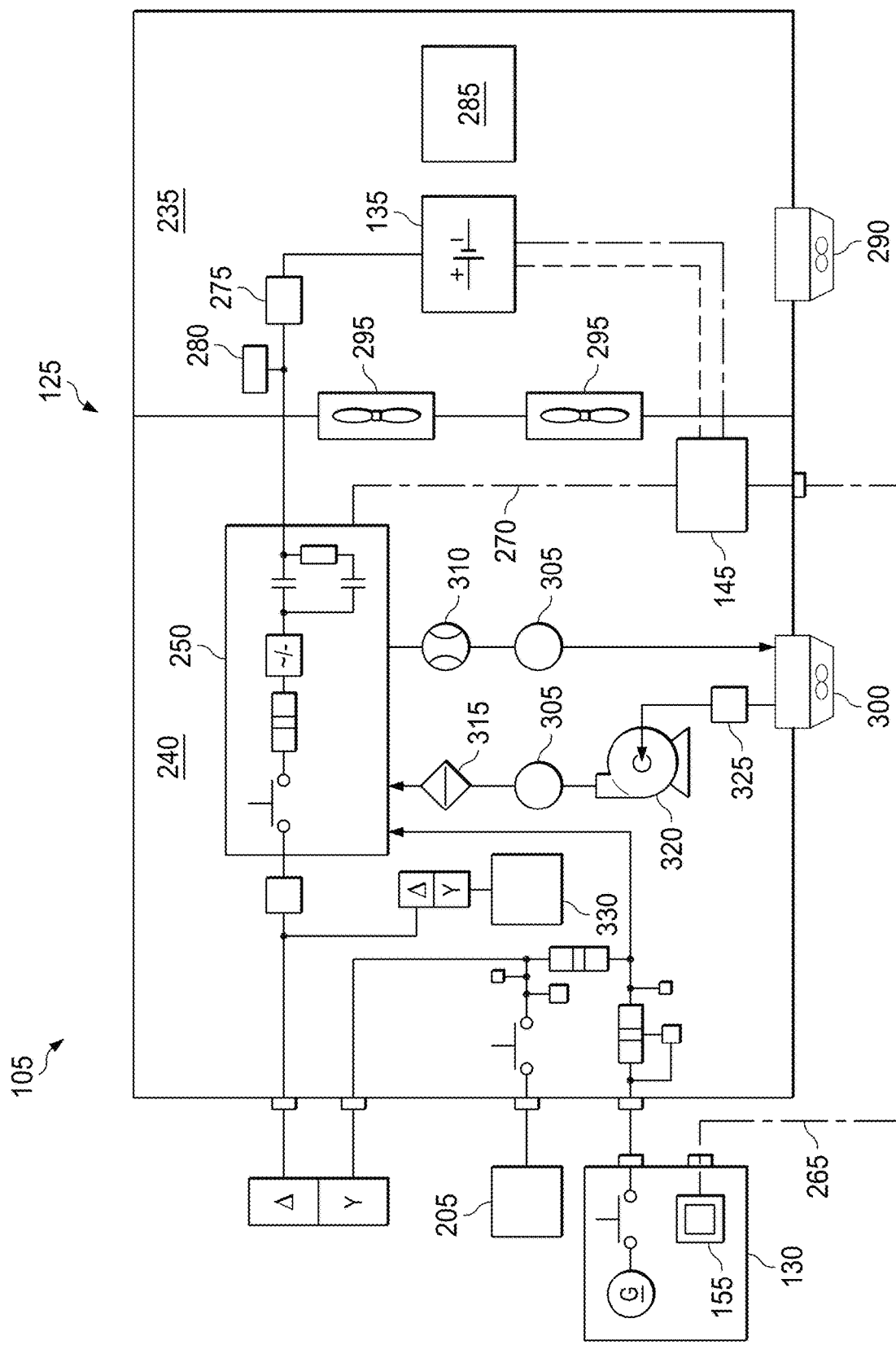
FIG. 2 illustrates the hybrid power system of the IDS system of FIG. 1, including a generator and an energy storage module ("ESM"), according to one or more embodiments of the present disclosure.

FIG. 2 is a schematic of the hybrid power system 105, according to one or more embodiments of the present disclosure. As illustrated, the hybrid power system 105 includes the ESM 125 and the generator 130 and the hybrid power system 105 is connected to a load 205. The load 205 may comprise any one or more devices or systems, and no limitation with respect to the same is provided herewith. For example, ESMs and generators of the present disclosure can provide electrical power to a pre-existing grid, a facility (e.g. a hospital building), a stand-alone device (e.g. a downhole pump), and various other systems and devices that require electrical power and that will be recognized by one of ordinary skill in the art.

As illustrated, the ESM 125 comprises a battery portion 235 and an inverter and control portion 240. The various features and components of the inverter and control portion 240 are operable to convert a direct current provided by the batteries of the battery portion 235 to an alternating current suitable for output to various devices and systems. The inverter and control portion 240 is further operable to monitor, analyze, and control an output. As illustrated, the ESM controller 145 is in communication with an inverter 250, the generator controller 155, and at least one battery, such as the battery 135. The controller 145 is operable to perform at least one of the following functions: detect a change in generator output (voltage, current, and/or frequency), signal a change in demand or load to the battery 135, demand additional power from the battery 135, and demand or signal an increase or decrease in generator functions (e.g. engine speed). The controller 145 is operable to perform these tasks and communicate with the aforementioned devices using a variety of methods/protocols such as Modbus TCP/IP 265, Canbus 270, and others know to those skilled in the art. An example ESM is described in FIG. 6 of U.S. patent application Ser. No. 17/839,042, the entirety of which is hereby incorporated by reference. Generally, the ESM 125 comprises a housing that is configured to be mobile and/or mobilized quickly and efficiently. For example, in some embodiments the ESM 125 includes a plurality of wheels and is configured to be towed by a vehicle; includes forklift channels configured to receive a forklift; a plurality of eye bolts and/or hoist rings configured for use with a crane; and the like. In some embodiments, the ESM 125 comprises a housing that forms the battery portion 235 and the inverter and control portion 240. In some embodiments, the housing of the ESM 125 is or includes an enclosure designed for outdoor use. In some embodiments, the enclosure of the ESM includes electrical connections configured for use with the plurality of generators, with the electrical connections forming a portion of an external surface of the housing.

While only one battery 135 is illustrated in FIG. 2, the battery 135 can be combined with other batteries in series or in parallel to provide a power source. In some embodiments, any single battery may have nominal voltages of about 936 VDC, voltage ranges from about 650 to about 1066 VDC, capacity of 123.5 KWH, as well as a number of other electrical properties. The voltage and capacity, however, are flexible. In order to reduce noise, the battery portion 235 is contemplated as being provided in communication with an electromagnetic interference (EMI) filter 275. The EMI filter 275 reduces noise from the battery 135 and from other ESM components or external devices. EMI filters can also be used to control noise in the inverter and control portion 240. A ground fault detector 280 is contemplated as being provided in various locations within systems of the present disclosure, including proximal to the EMI filter 275.

In some embodiments, the battery portion 235 includes a fire suppression system 285. The fire suppression system 285 is preferably provided proximal to the battery 135, outside of the battery portion 235, and/or outside the ESM 125. Furthermore, additional heat management may be contained in the battery portion 235, such as an air conditioner 290 or a fan 295. One of ordinary skill in the art will recognize that various devices of the present disclosure, including batteries (e.g. lithium-ion batteries) must be maintained within a preferred temperature range to optimize performance and safety of the battery or batteries.

Safety features are also contemplated as being incorporated into the inverter and control portion 240. For instance, the inverter 250 is contemplated as being in thermal communication with a heat exchanger 300. In some embodiments, the thermal communication pathway between the inverter 250 and heat exchanger 300 is contemplated as being equipped with temperature sensors 305, flow sensors 310, a filter 315, a pump 320, and a reservoir 325. The various devices help to further ensure the safety and reliability of the ESM 125. Furthermore, additional pumps/fans 330 can be added to the inverter and control portion 240 to aid in cooling.

Figure 3:
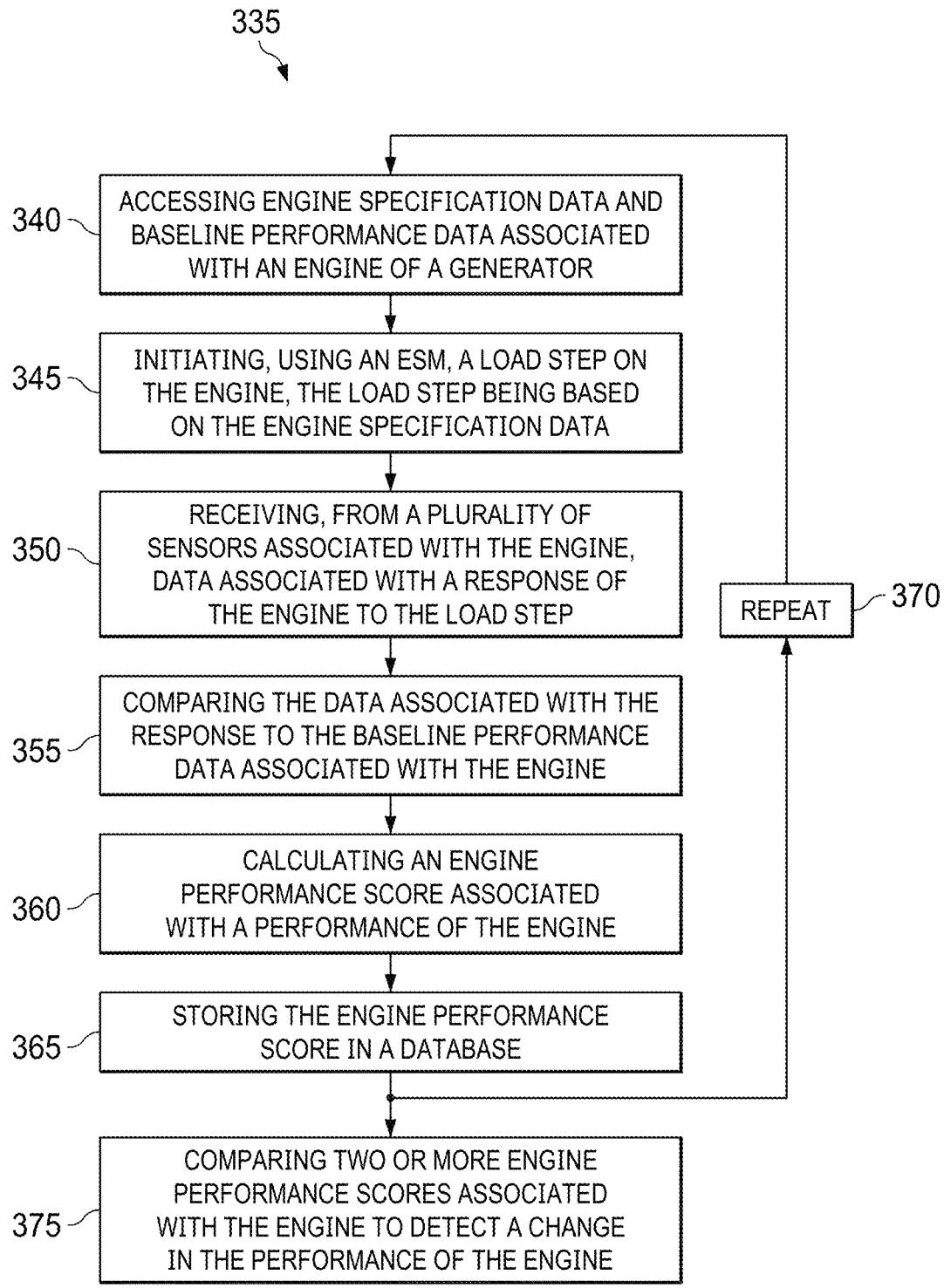
FIG. 3 illustrates a method of operating the IDS system of FIG. 1, according to one or more embodiments of the present disclosure.

Referring to FIG. 3, with continued reference to FIGS. 1 and 2, a method 335 of operating the IDS system 100 to perform an IDS test with respect to the engine 150 of the generator 130 is provided. The IDS test enables the health and performance of the engine 150 to be evaluated and monitored. In some embodiments, the method 335 includes accessing engine specification data and baseline performance data associated with an engine of a generator at step 340; initiating, using an ESM, a load step on the engine at step 345; receiving, from a plurality of sensors associated with the engine, data associated with a response of the engine to the load step at step 350; comparing the data associated with the response to the baseline performance data associated with the engine at step 355; calculating an engine performance score associated with a performance of the engine at step 360; storing the engine performance score in a database at step 365; repeating the steps 340-365 at step 370; and comparing two or more engine performance scores associated with the engine to detect a change in the performance of the engine at step 375.

In some embodiments and at the step 340, the controller 145 of the ESM 125 accesses the digital twin 115 associated with the engine 150 of the generator 130. As described above, in one or more embodiments, the controller 145 of the ESM 125 may access the digital twin 115 directly from the engine controller 155 of the generator 130 once the generator 130 is connected to the ESM 125. As also described above, in one or more other embodiments, the controller 145 of the ESM 125 may access the digital twin 115, via the network 120, from a manufacturer database positioned remotely relative to the hybrid power system 105. From the digital twin 115, the controller 145 of the ESM 125 accesses the engine specification data 192 and the baseline performance data 194 associated with the engine 150 that will be subjected to the IDS test.

In some embodiments and at the step 345, the controller 145 of the ESM 125 initiates the IDS test on the engine 150 of the generator 130. To initiate the IDS test, the controller 145 accesses and executes the IDS application 190. In doing so, the controller 145 of the ESM 125 initiates a load step on the engine 150 of the generator 130. Generally, the IDS test commands a 0-100% rated load step on the engine 150. The specifications of the load step are based on the engine specification data 192 accessed from the digital twin 115 and associated with the engine 150. In one or more embodiments, the engine specification data 192 defines a maximum load rating or an ideal load rating for the engine 150. The controller 145 of the ESM 125 executing the IDS application 190 uses these load ratings to define the specifications of the load step placed across the engine 150. In one or more embodiments, the baseline performance data 194 associated with the engine 150 is based on the performance of the engine 150 when subjected to the maximum load rating or the ideal load rating defined by the engine specification data 192.

The battery 130 of the ESM 125 is used by the controller 145 to provide the controlled load step on the engine 150. In some embodiments, the load step initiated on the engine 150 using the battery 130 is less than or equal to the available charging capacity of the battery 130 to ensure that the battery 130 has adequate capacity to absorb the output of the engine 150 in response to the IDS test.

An inverter associated with the ESM 125, such as the inverter 250 of FIG. 2, and controls associated therewith, make precision measurements of the power output generated by the engine 150 in response to the IDS test. In one or more embodiments, the inverter is able to generate precision measurements relating to the voltage, current, ramp rates, and harmonic distortion associated with the response of the engine 150 to the IDS test. This provides a relative and measured response to power commands.

During normal operation of the hybrid power system 105, the battery 130 of the ESM 125 supplements the power output of the engine 150 in response to a "droop" resulting from a load being placed on the engine 150. Such operation can mask performance issues associated with the engine 150. Thus, upon initiation of the IDS test, the controller 145 of the ESM 125 adjusts the tuning of the inverter to prevent the battery 130 of the ESM 125 from supplementing the power of the engine 150 in response to the load step. As such, the engine 150 is isolated during the IDS test so that the performance of the engine 150 can be accurately evaluated.

The engine 150 of the generator 130 is equipped with various measuring devices, such as the plurality of sensors 158 described above. With respect to the response of the engine 150 to the load step of the IDS test, the plurality of sensors 158 are configured to identify a plurality of parameters associated with engine performance, stability, thermal efficiency, mechanical efficiency, and vibration. As described above, these parameters include all or some of the following: engine coolant temperature, exhaust gas temperature, manifold pressure, throttle inlet pressure, oil pressure, crankcase pressure, intake air temperature, fuel flow, throttle position, and vibration measured through an accelerometer. The plurality of sensors 158 generate data associated with these parameters and the response of the engine 150 to the load step.

In some embodiments and at the step 350, the data generated by the plurality of sensors 158 and associated with the response of the engine 150 to the load step of the IDS test is transmitted to, and received by, the controller 145 of the ESM 125.

In some embodiments and at the step 355, the controller 145 of the ESM 125 compares the data received from the plurality of sensors 158 with the baseline performance data 194 of the engine 150 in order to evaluate the current performance of the engine 150 during the IDS test relative to a baseline performance of the engine 150 specified by the manufacturer of the engine 150.

In some embodiments and at the step 360, the controller 145 of the ESM 125 calculates an engine performance score for the engine 150 based on the comparison of the data received form the plurality of sensors 158 and the baseline performance data 194 performed at step 355. In one or more embodiments, each parameter associated with each sensor of the plurality of sensors 158 may be evaluated on a graded scale and given a score from 1 to 10 based on the comparison of the IDS test data of each parameter to the baseline performance data of each respective parameter. In one or more embodiments, the plurality of engine performance scores calculated for the plurality of parameters may then be averaged together to calculate a single engine performance score for the engine 150.

In some embodiments and at the step 365, the engine performance score(s) calculated at step 360 for the engine 150 based on the IDS test performed on the engine 150 are stored in a database, such as the database 175 of the computer 110. The engine performance scores are stored as the historical performance data 195 in the database 175. The engine performance scores calculated for the engine 150 during each IDS test are stored as historical performance data 195 so that the evolution of the health and performance of the engine 150 can be monitored and evaluated over time.

In some embodiments and at the step 370, the IDS test, including step 340 through step 365, is repeated for the engine 150 at a future time. The IDS tests performed with respect to the engine 150 may be scheduled at predetermined intervals or may be performed as needed.

In some embodiments and at the step 375, after two or more IDS tests have been performed on the engine 150, the engine performance scores from the two or more IDS tests are compared to detect a change in the performance of the engine 150. Generally, an engine and its performance will deteriorate over time, which would be reflected by a change, either up or down, in engine performance scores over time and between successive IDS tests. However, when maintenance is performed on an engine, the engine and its performance may improve, which would be reflected by a change in engine performance scores in the opposite direction between successive IDS tests.

Using the engine performances scores and the comparison of the engine performance scores over time, a number of estimations and determinations can be made regarding the engine 150 of the generator 130. In one or more embodiments, for example, the engine performance scores may be used to estimate a remaining life, or remaining useful life of the engine 150 before the engine 150 will need replacing, rebuilding, or routine maintenance performed. In one or more embodiments, the individual engine performance scores associated with the individual engine parameters may be used to identify particular components of the engine 150 that are deteriorating and in need of replacement or preventative maintenance. As such, the engine performance scores can be used to determine maintenance and overhaul schedules for the engine 150 so that maintenance and replacement can be performed at convenient times and avoid the incidence of sudden failures during critical periods of operation.

In one or more embodiments, after performing one or more IDS tests on an engine of a first generator, the first generator may be disconnected from the ESM 125 and a second generator that is different from the first generator may be connected to the ESM 125. The ESM 125 may then be used to execute method 335 to perform one or more IDS tests with respect to an engine of the second generator. In such embodiments, the controller 145 of the ESM 125 may retain the digital twin and the historical performance data of the first generator after the first generator has been disconnected. In this way, the controller 145 of the ESM 125 generates a catalog of a plurality of digital twins and historical performance data for a plurality of different generators.

In one or more embodiments, the steps of the method 335 are implemented by the controller 145 executing the IDS application 190 and sent, via the network 120, to a location and/or computer 110 remote from the generator 130 and ESM 125. In one or more embodiments, the controller 145 executing the IDS application 190 initiates the steps of the method 335 without human input. In one or more embodiments, the controller 145 executing the IDS application 190 monitors the hybrid power system 105 and alerts/communicates, via the network 120, a potential load performance issue, a potential or identified maintenance issue, a predicted future load performance issue, or a predicted future lifespan.

Referring to FIG. 4, a table 400 is provided showing the calculated engine performance scores for each measured engine parameter associated with the plurality of sensors 158, as well as an average, or composite, engine performance score for the engine 150 as a result of the IDS test. In one or more embodiments, all or a portion of the information shown in the table 400 may be displayed via the GUI 160 such that this information is visible to an operator of the hybrid power system 105.

Referring to FIGS. 5A, 5B, and 5C, tables 505, 510, and 515 are provided showing the results of multiple IDS tests performed with respect to the engine 150 of the generator 130. For example, the table 505 is associated with test results after 5,000 hours of use, the table 510 is associated with test results after 10,000 hours of us, and the table 515 is associated with test results after 20,000 hours. In one or more embodiments, the historical performance data 195 associated with the engine 150 may be displayed via the GUI 160 so that general trends in engine performance can be made visible to the operator. In one or more embodiments, the current engine performance scores as well as the historical performance data 195 may be displayed simultaneously via the GUI 160. In one or more embodiments, the total run-time in hours that the engine 150 has been operating at the time an IDS test was performed may be displayed with the calculated engine performance scores. In one or more embodiments, an estimated remaining life in hours of the engine 150, which may be estimated based on the results of each IDS test, may be displayed along with the calculated engine performance scores of each IDS test. By displaying this information to operators, the operators are better informed regarding engine operation, overhaul and maintenance requirements, and replacement cycles.

Storing and comparing the historical performance data 195 associated with the engine 150 also facilitates improved inventory control for greater reliability and resiliency. In one or more embodiments, an IDS program, based on the measured parameters and compared scores over time, predicts the repair and replacement needs of individual components of the engine, for example, if one parameter is showing a more significant drop in performance as compared to the rest of the parameters.

Figure 7:
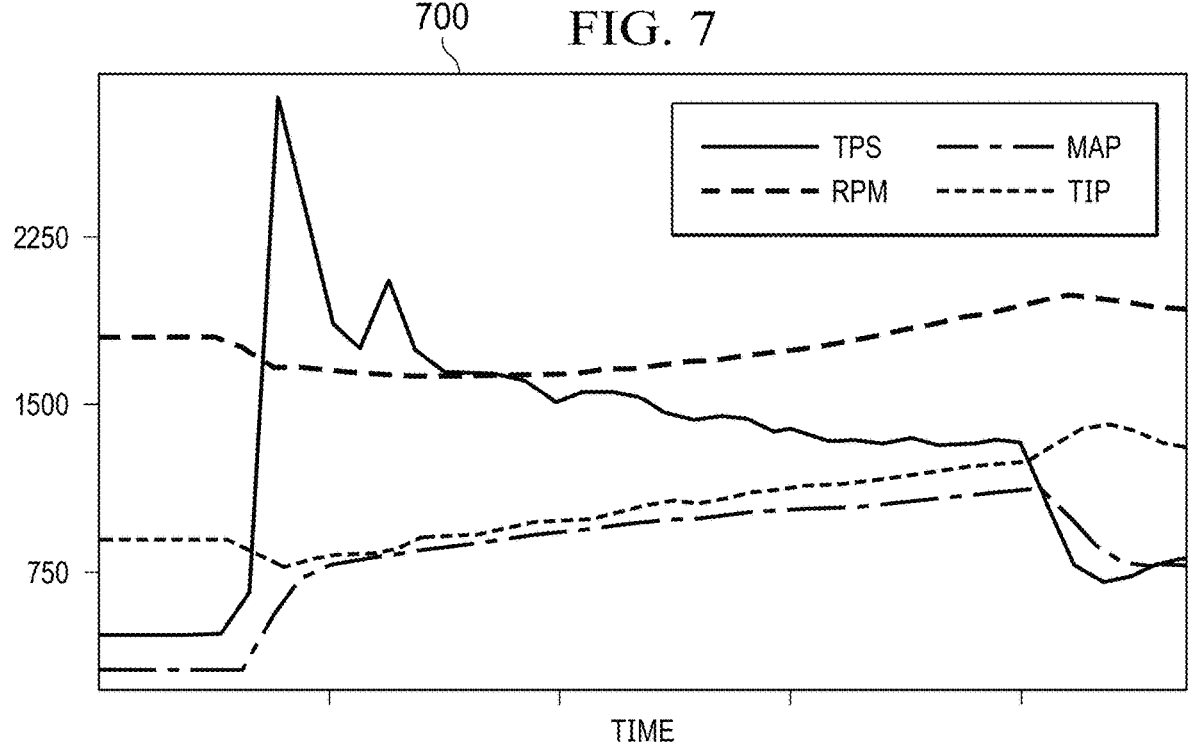
Figure 8:
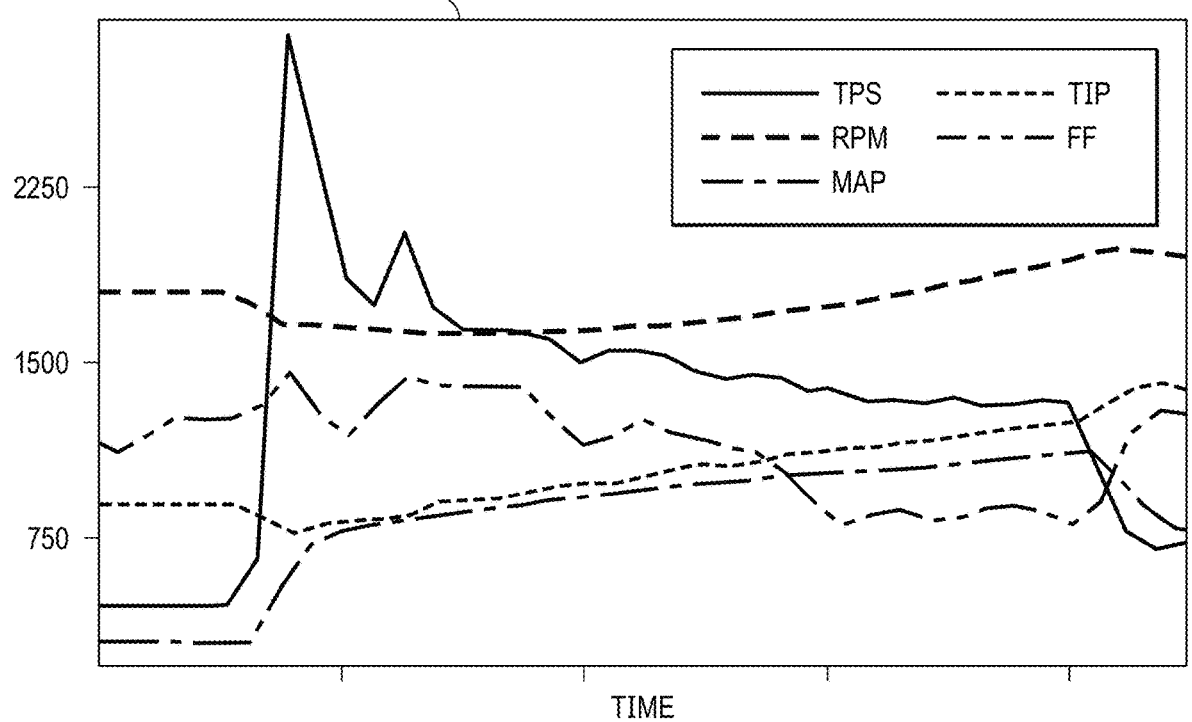

Referring to FIGS. 6-8, example responses of the engine 150 to the load step of the IDS test measured by a portion of the plurality of sensors 158 are provided.

FIG. 6 provides a graph 600 depicting the throttle response (measured using the TPS) and the deflection in RPM, or droop in RPM, over time. The graph 600 illustrates the time required for the engine 150 to fully recover to the commanded engine speed, which is 1800 RPM in the example shown.

FIG. 7 provides a graph 700 further depicting the MAP and TIP responses of the engine 150 during the IDS test. The plurality of sensors 158 capture and record the MAP and TIP to characterize the mechanical efficiency and the effectiveness of the induction system of the engine 150.

FIG. 8 provides a graph 800 further depicting the FF response required to support the commanded load step of the IDS test. The amount of fuel required to support the response of the engine 150 to the load step is accessed through a fuel valve of the engine 150 or through an external source. The graphs 600, 700, and 800 utilize an engine control platform to illustrate IDS functionality. In one or more embodiments, the IDS application utilizes a separate purpose-built diagnostic and data acquisition platform.

Figure 9:
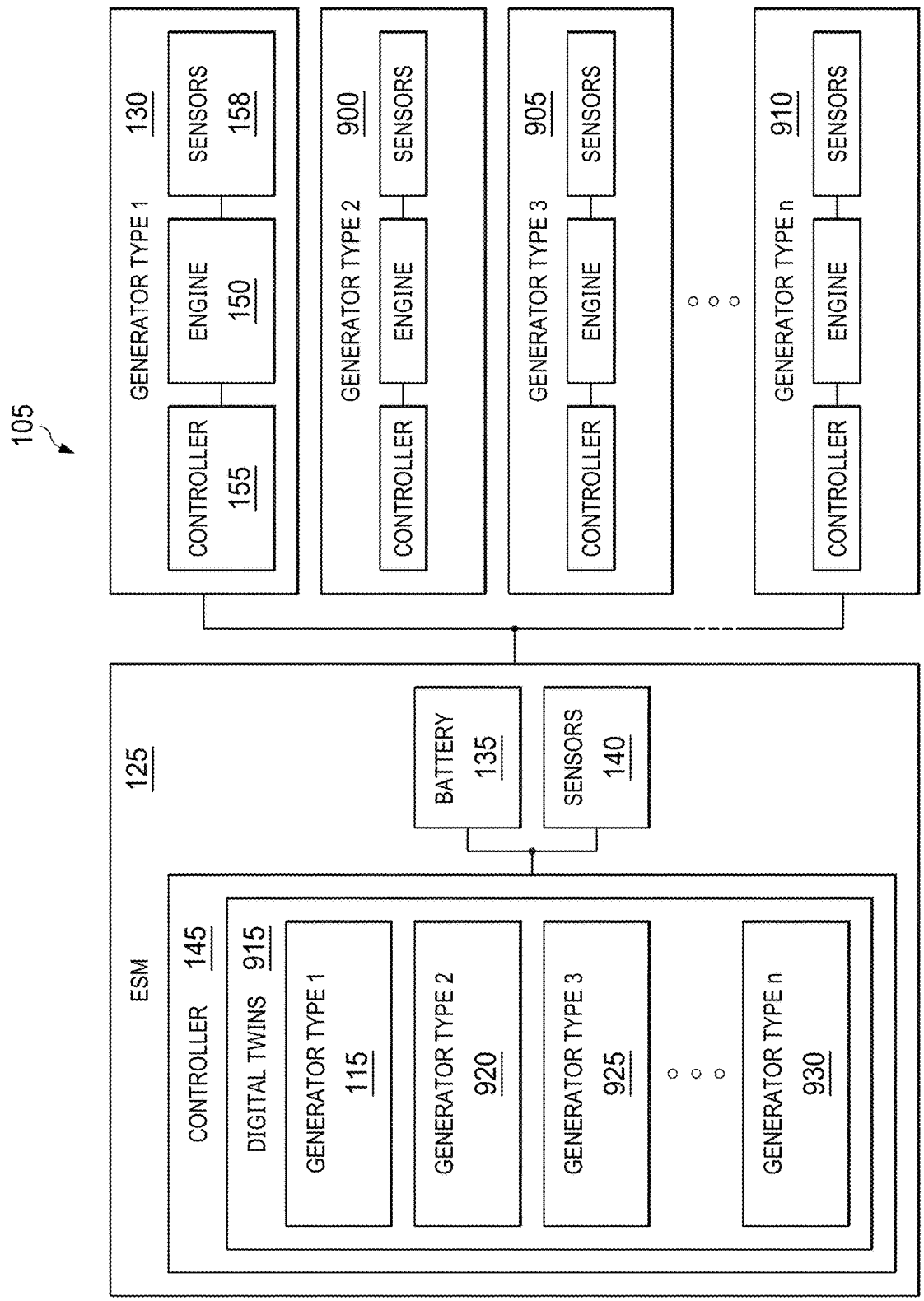
FIG. 9 illustrates another embodiment of the IDS system, including a hybrid power system having a plurality of generators, an ESM, and a computer, according to one or more embodiments of the present disclosure.

Referring to FIG. 9, with continued reference to FIGS. 1-8, another embodiment of the hybrid power system 105 of the IDS system 100 is shown. As described above, the ESM 125 of the hybrid power system 105 is configured to be connected to a plurality of generators or other power sources simultaneously. In the embodiment shown in FIG. 9, the ESM 125 is connected to the generator 130, a second generator 900, a third generator 905, and an n'th generator 910. The generator 130 is a first type of generator, the second generator 900 is a second type of generator, the third generator 905 is a third type of generator, and the n'th generator 910 is an n'th type of generator. In one or more embodiments, the first, second, and third types of generators are all different types of generators. As used herein, the "type" of generator refers to the type of engine (e.g., make and model) associated with the generator.

Each generator of the plurality of generators connected to the ESM 125 has a controller, an engine, and a plurality of sensors similar to those described above with respect to the generator 130. In some embodiments, a digital twin catalog 915 including a digital twin associated with each engine of the plurality of generators, or each type of engine of each generator of the plurality of generators. The digital twin catalog 915 includes the digital twin 115 associated with the first type of engine of the generator 130, a digital twin 920 associated with the second type of engine of the second generator 900, a digital twin 925 associated with the third type of engine of the third generator 905, and a digital twin 930 associated with the n'th type of engine of the n'th generator 910.

In the embodiment shown in FIG. 9, the hybrid power system 105 including the ESM 125 and the plurality of generators are connected to form a multi-unit microgrid. Such a system is operated in parallel and load-shares the connected loads. Often, only the generator(s) required to support the load are operated. In this way, fuel savings can be achieved by turning off or not starting the generators not required for the reduced load. The additional generators are brought online with the running generators as the load is presented. This is commonly referred to as "auto-sequencing" with each generator in the microgrid assigned an operating order priority. For example, in a four-unit microgrid the generator assigned as "Unit 1" would be operating continuously and support the minimum load. As the load increases, "Unit 2" would be brought online and the load shared equally between the two running power systems. The hybrid part of the system provides the "ride-through" power required to allow Unit 2 to start and begin load sharing. The process continues as the load continues to increase until all of the plurality of generators are online and sharing the connected load.

Historically, the sequencing order of the generators has been either randomly selected by the operator or assigned by unsophisticated methods such as total run hours on the generators. Such methods do not consider the relative "health" of each generator.

Using the method of evaluating the health and performance of a generator described above, the selection of the sequencing order for a plurality of generators in a hybrid power system can be significantly improved. Using engine performance scores calculated for each generator in the system after performing one or more IDS test with respect to each generator, the most robust generator can be assigned as Unit 1 followed by the second best as Unit 2, and so on. In this way, the hybrid power system better distributes the workload across the generators for added reliability and resiliency.

Figure 10:
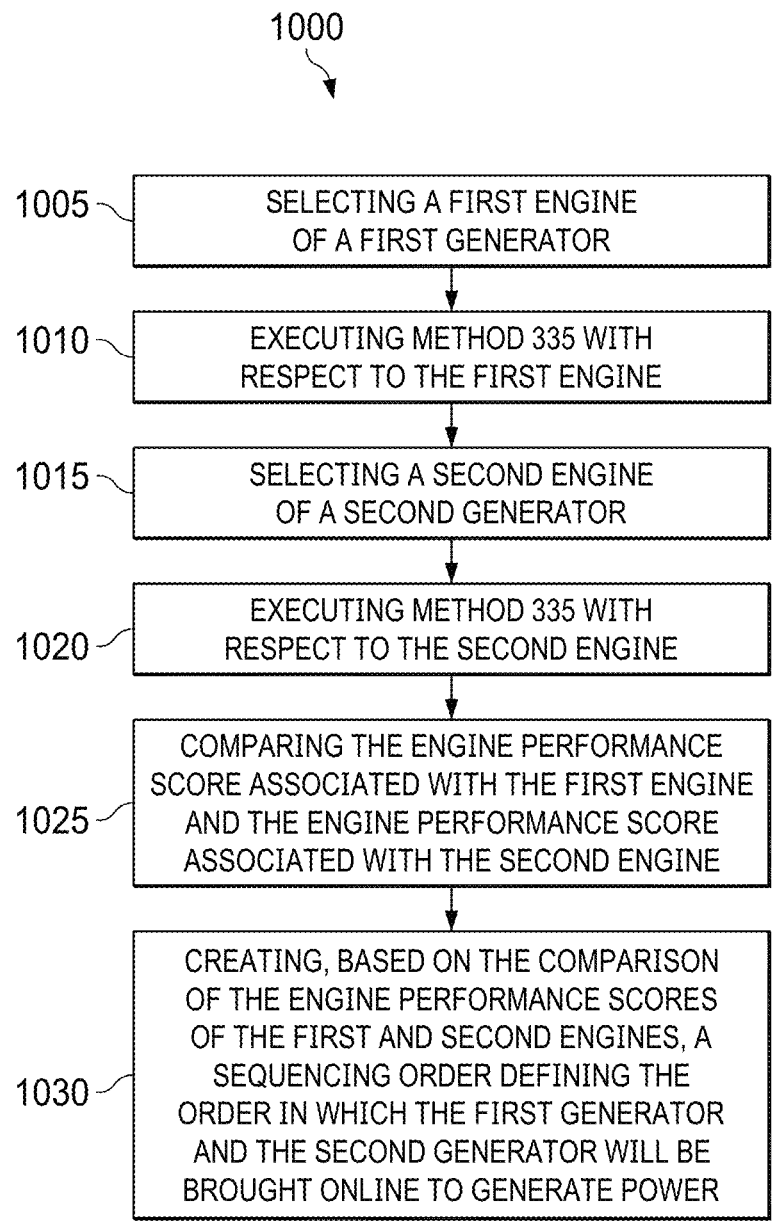
FIG. 10 illustrates a method of operating the IDS system of FIG. 9, according to one or more embodiments of the present disclosure.

Referring to FIG. 10, with continued reference to FIGS. 1-9, a method 1000 of using the IDS system 100 to optimize the sequencing order of two or more generators in a hybrid power system, such as the hybrid power system 105 shown in FIG. 9, is provided. In some embodiments, the method 100 includes selecting a first engine of a first generator at step 1005; executing the method 335 with respect to the first engine at step 1010; selecting a second engine of a second generator at step 1015; executing the method 335 with respect to the second engine at step 1020; comparing the engine performance score associated with the first engine and the engine performance score associated with the second engine at step 1025; and creating, based on the comparison of the engine performance scores of the first and second engines, a sequencing order defining the order in which the first generator and the second generator will be brought online to generate power at step 1030.

In some embodiments, the method 1000 may be performed while the two or more generators are simultaneously connected to the ESM 125. In one or more embodiments, the method 100 may be performed while only the generator being tested is connected to the ESM 125. For example, a plurality of generators may be located in a storage facility. The plurality of generators may be subjected to an IDS test one at a time, and the results of each test can be used to determine the sequencing order when two or more of the generators are eventually connected to the ESM 125.

In some embodiments and at the step 1005, the controller 145 of the ESM 125 selects the generator 130.

In some embodiments and at the step 1010, the method 335 is executed as described above such that an IDS test is performed with respect to the generator 130 and such that a first engine performance score is generated for the generator 130. In order to execute the method 335 with respect to the generator 130, the digital twin 115 associated with the generator 130 is accessed by the controller 145 from the digital twin catalog 395. In some embodiments, execution of the method 335 excludes the step 370. That is, the step 1010 may only include calculating one engine performance score associated with the first engine.

In some embodiments and at the step 1015, the controller 145 of the ESM 125 selects the second generator 900. In one or more embodiments, the controller 145 may deselect the generator 130 prior to selecting the second generator 900.

In some embodiments and at the step 1020, the method 335 is executed as described above such that an IDS test is performed with respect to the second generator 900 and such that a first engine performance score is generated for the second generator 900. In order to execute the method 335 with respect to the second generator 900, the digital twin 920 associated with the second generator 900 is accessed by the controller 145 from the digital twin catalog 915. In some embodiments, execution of the method 335 excludes the step 370. That is, the step 1020 may only include calculating one engine performance score associated with the second engine.

In some embodiments and at the step 1025, the controller 145 of the ESM 125 compares the first engine performance score of the generator 130 and the first engine performance score of the second generator 900. Based on this comparison, the controller 145 can determine which generator is the healthiest or has better performance.

In some embodiments and at the step 1030, the controller 145 of the ESM 125 determines and creates, based on the comparison of step 1025, the sequencing order for the hybrid power system 105. In one or more embodiments, as discussed above, it is most efficient to operate the hybrid power system 105 with a sequencing order that brings each generator of the two or more generators online in the order of best performance. In one or more embodiments, operating the hybrid power system with the sequencing order that brings each generator online in the order of best performance reduces greenhouse gas emissions compared to conventional systems.

In some embodiments, the method 1000 also includes bringing each of the generators 120, 900, 905, and 910 online in accordance with the sequencing order.

In one or more embodiments, the method 1000 can include executing the method 335 (i.e., performing an IDS test) for as many generators, with as many different types of engines, as needed, desired, or required for a particular application.

In one or more embodiments, the method 1000 can be repeated as many times as needed, desired, or required for a particular application in order to update and optimize the sequencing order of the two or more generators connected to the ESM 125 to ensure the most efficient generators of the hybrid power system are coming online first. For example, in one or more embodiments, first engine performance scores may be generated for the two or more generators. Based on the first engine performance scores, the sequencing order for the two or more generators can be determined. Then, at random or at scheduled intervals, each of the two or more generators may be subjected to a second IDS test such that second engine performance scores are generated for the two or more generators. Based on a comparison of the second engine performance scores, the sequencing order of the two or more generators can be updated if needed.

Figure 11C:
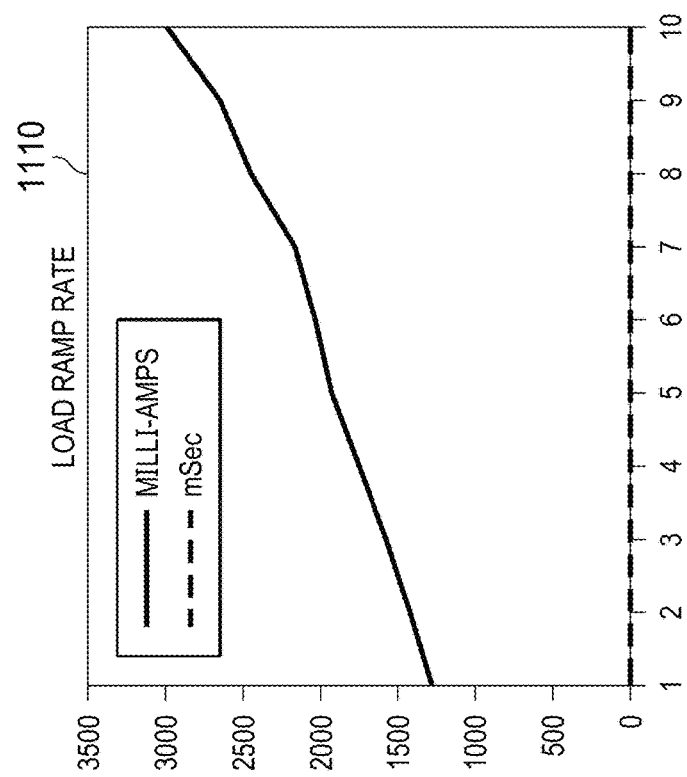
FIGS. 11A, 11B, and 11C illustrate measured electrical output and work performed by each generator, according to one or more embodiments.
Figure 11B:
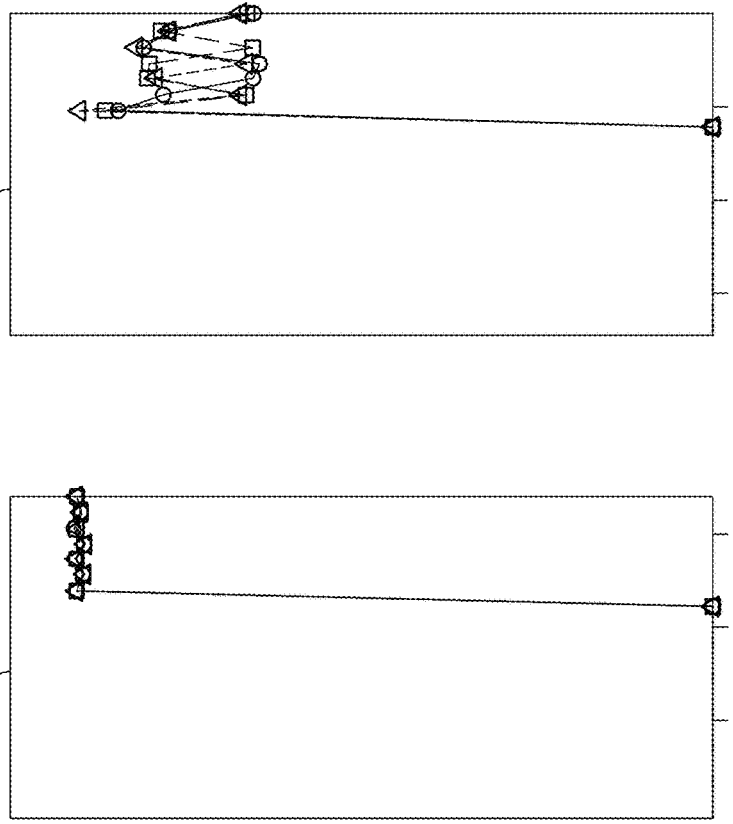
Figure 11A:
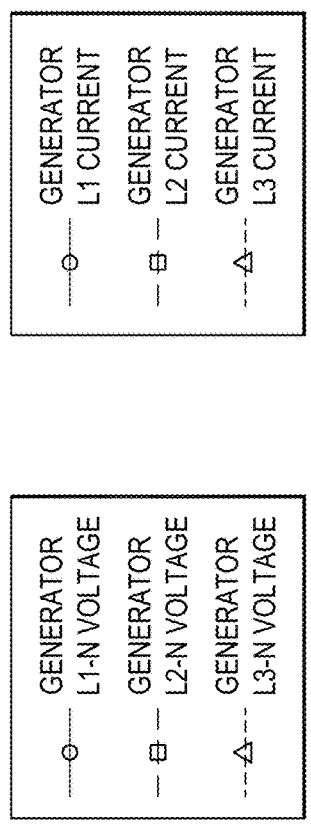

Referring to FIGS. 11A, 11B, and 11C, graphs 1100, 1105, and 1110 depict the responses of three example generators to an IDS test. Graph 1100 depicts the measured voltage associated with the response of each generator during the load ramping of the IDS test. Graph 1105 depicts the measure current associated with the response of each generator during the load ramping of the IDS test. Graph 1110 depicts the load ramp rate during the IDS test. Measuring the electrical output and work performed by each generator during an IDS test facilitates the evaluation and comparison of the health and performance of each generator.

The hybrid power systems disclosed herein, such as those used in military applications, are often stored for long periods before being transported thousands of miles to the area of operations where the system is put into service. Even with extensive periodic maintenance practices and sophisticated diagnostic tools, these systems are often prone to early failures or soon require an unplanned major repair that renders them inoperable. This can impact the mission readiness of critical connected equipment, thereby putting the warfighter at risk. Weapons systems, radar and communications systems, or an entire field hospital can be severely impacted or unavailable because of the unexpected loss of a supporting power system. The IDS system 100 disclosed herein significantly reduces these events by providing the current engine performance scores along with the average engine performance scores. A system nearing the end of its service life or in need of significant repair would be readily apparent based on the score on the GUI without the need for additional service inspections or diagnostic tools.

In one or more embodiments, the hybrid power system 105 provides load support to the prime mover that powers the loads. The inverter injects current in response to a droop in frequency that results from the loss in RPM as an engine-driven generator responds to significant load steps. This frequency regulation provides a consistent flow of stable energy to the connected loads as load events occur. While this is desirable and a key advantage to a hybrid power system, it can create an unintended risk to the overall resiliency of the complete hybrid power plant by "masking" the reduced performance in an aging engine-driven system or by compensating for a poorly performing system in need of service or repair. These issues can be masked and allow the system to further degrade until a catastrophic failure occurs or the affected system is incapable of satisfying the necessary output required to support the hybrid power plant. The systems and methods regarding IDS testing disclosed herein not only expose the compromised power system's underperformance, but it also provides a score used to assess the relative degree of underperformance compared to the established performance baseline.

In one or more embodiments, the IDS system disclosed herein, including the controller and program, provide the testing protocol, store and display data, and manage the IDS testing. In one or more embodiments, the IDS system includes sensing devices and the interface device that connects and transfers data to the controller. In one or more embodiments, the sensing devices are not part of the power system controls used by the OEM and do not impact the performance or management of the power system. The MAP and IAT sensors are specialized devices that measure ambient temperature and barometric pressure to account for normal performance degradation due to high ambient temperatures and altitudes.

Advanced diagnostics and "smart" microgrid controls coupled with the ESM used on a hybrid power system provide a controllable load that can be connected to the power system's prime mover (i.e., the generator). Specific data can be measured, stored, and compared during consistent loading and unloading events made possible by the available capacity of the ESM, the precise energy analysis provided by advanced power electronics, and the measurement of relevant engine diagnostic data. Each IDS test can be evaluated and compared against an established standard, such as the baseline performance data associated with the engine of the generator, and with the historical performance data associated with past IDS tests performed on the engine, to better inform predictive maintenance events, overhaul schedules, and end-of-life. IDS tests could be scheduled into the normal operating functions performed by the power system with no impact on the intended application or power system functionality.

The inverter and power electronics used on a hybrid power system use highly sensitive and accurate power-measuring devices that are used in the integration of the stored energy with the electrical output of the engine-driven generator. These same devices are repurposed with the IDS program to provide precise measurements of the electrical output and work performed by the connected power system during the IDS test. The hybrid controller modifies the tuning during an IDS test to allow "droop" to occur and can assess the response from the power system and the system's ability to accept load commands. This sophisticated analysis uses onboard devices and eliminates the need to connect external power analyzers while providing similar data that is used in the engine performance score computations.

In one or more embodiments, equipment in inventory can be "graded" via an IDS test and/or engine performance score to provide better inventory control of viable assets. For example, a remote site (e.g., a site that has an ingress or egress time beyond a threshold) may require a minimum engine performance score to be considered as a viable power system eligible to deploy but a lower score may be acceptable if the equipment is to be used for a local training exercise.

Figure 12:
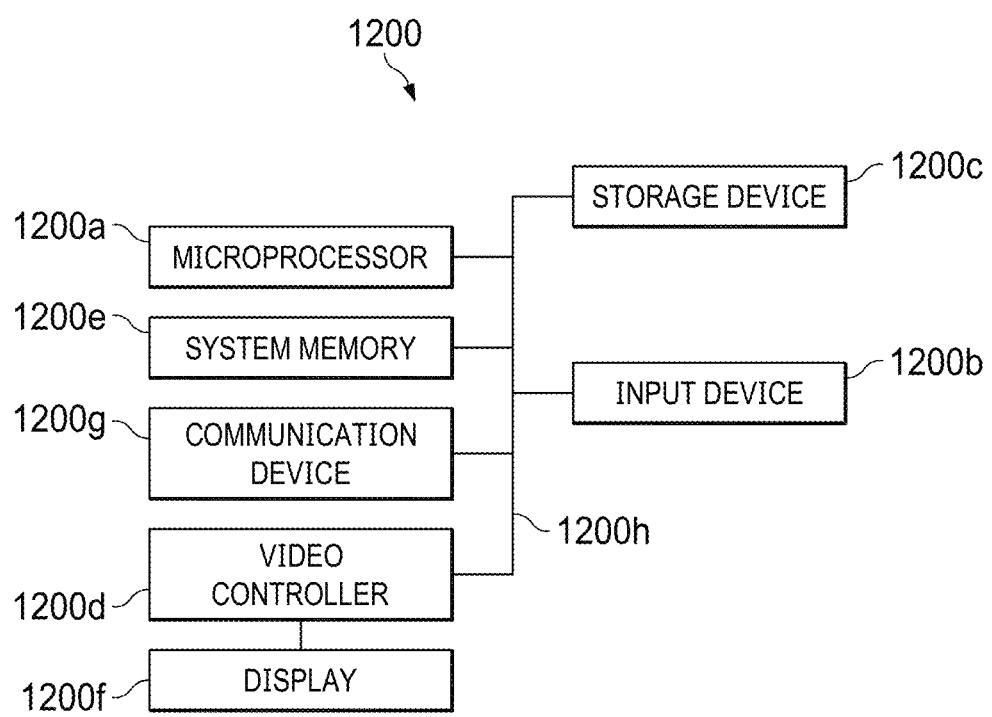
FIG. 12 illustrates a node for implementing one or more of the above embodiments, according to one or more embodiments of the present disclosure.

In an example embodiment, as illustrated in FIG. 12, with continued reference to FIGS. 1-11, an illustrative node 1200 for implementing one or more of the example embodiments described above and/or illustrated in FIGS. 1-11 is depicted. The node 1200 includes a microprocessor 1200a, an input device 1200b, a storage device 1200c, a video controller 1200d, a system memory 1200e, a display 1200f, and a communication device 1200g all interconnected by one or more buses 1200h. In several example embodiments, the storage device 1200c may include a floppy drive, hard drive, CD-ROM, optical drive, any other form of storage device and/or any combination thereof. In several example embodiments, the storage device 1200c may include, and/or be capable of receiving, a floppy disk, CD-ROM, DVD-ROM, or any other form of computer-readable medium that may contain executable instructions. In several example embodiments, the communication device 1200g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-11 include at least the node 1200 and/or components thereof, and/or one or more nodes that are substantially similar to the node 1200 and/or components thereof. In several example embodiments, one or more of the above-described components of the node 1200 and/or the example embodiments described above and/or illustrated in FIGS. 1-11 include respective pluralities of same components.

In several example embodiments, one or more of the applications, systems, and application programs described above and/or illustrated in FIGS. 1-11 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof. The one or more server(s), in some embodiments may be remote and accessible by a cloud or other network described herein.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server. In some embodiments, software includes one or more software modules including code, programming object, programming structure, or combinations thereof. In one or more embodiments, the one or more software modules comprise, by way of nonlimiting examples, a web application, a mobile application, and a standalone application. In various embodiments, software modules are in more than one computer program or application. In some embodiments, the software modules are hosted by more than one machine. In some embodiments, the software modules are hosted by more than one machine in more than one location.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, instructions are stored on a non-transitory computer readable medium and executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1200a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

The present disclosure introduces a method for testing engine performance of generator(s) using an energy storage module ("ESM"), the ESM comprising one or more batteries and a controller configured to be operably coupled to the generator(s), each of the generator(s) comprising an engine associated with a plurality of engine sensors, engine specification data, and baseline performance data, and the method comprising: (a) accessing, using the controller, engine specification data and baseline performance data associated with a selected engine of one of the generator(s); (b) initiating, using the controller and the one or more batteries, a load step on the selected engine, the load step being based on the engine specification data associated with the selected engine; (c) receiving, by the controller and from a plurality of sensors associated with the selected engine, data associated with a response of the selected engine to the load step of step (b); (d) comparing, using the controller, the data of step (c) to the baseline performance data associated with the selected engine; (e) calculating, using the controller and based on the comparison of step (d), an engine performance score associated with a performance of the selected engine; and (f) storing, using the controller, the engine performance score of step (e) in a database associated with the controller. In one embodiment, the selected engine is a first engine of a first generator of the generator(s) and the engine performance score calculated for the selected engine is a first engine performance score associated with a performance of the first engine. In one embodiment, the method further includes (g) identifying, using the controller and based on the first engine performance score, a future maintenance activity for the first engine. In one embodiment, the method further includes (h) predicting, using the controller and based on the first engine performance score, a service life of the first engine. In one embodiment, step (a) further comprises accessing a digital twin associated with the first engine; and the digital twin comprises the engine specification data and the baseline performance data associated with the first engine. In one embodiment, the method further includes (i) repeating the steps (b)-(f) such that the engine performance score calculated for the selected engine is a second engine performance score associated with the performance of the first engine; and (j) comparing, using the controller, the first engine performance score and the second engine performance score to detect a change in the performance of the first engine. In one embodiment, the method further includes (k) selecting, using the controller, a second engine of a second generator of the generator(s) such that the second engine is the selected engine; and (l) executing steps (a)-(f) such that the engine performance score calculated for the selected engine is a first engine performance score associated with a performance of the second engine. In one embodiment, the method further includes (m) comparing, using the controller, the first engine performance score associated with the performance of the first engine and the first engine performance score associated with the performance of the second engine; and (n) creating, using the controller and based on the comparison of step (m), a sequencing order defining the order in which the first generator and the second generator will be brought online to generate power. In one embodiment, the comparison of step (m) indicates that the performance of the first engine is greater than the performance of the second engine; and the sequencing order of step (n) defines that the first generator will be brought online before the second generator. In one embodiment, the performance of the first engine is the fuel efficiency of the first engine and the performance of the second engine is the fuel efficiency of the second engine; and the sequencing order of step (n) is created such that the more fuel efficient engine of the first and second engines is ordered to be brought online first in order to reduce the amount of fuel used by the generator(s). In one embodiment, the method further includes (o) repeating the steps (b)-(f) such that the engine performance score calculated for the selected engine is a second engine performance score associated with the performance of the first engine; (p) executing steps (b)-(f) such that the engine performance score calculated for the selected engine is a second engine performance score associated with a performance of the second engine; (q) comparing, using the controller, the second engine performance score associated with the performance of the first engine and the second engine performance score associated with the performance of the second engine; and (r) updating, using the controller and based on the comparison of step (q), the sequencing order defining the order in which the first generator and the second generator will be brought online to generate power. In one embodiment, the comparison of step (q) indicates that the performance of the second engine is greater than the performance of the first engine; and the updated sequencing order of step (r) defines that the second generator will be brought online before the first generator.

The present disclosure introduces an energy storage module ("ESM") capable of testing engine performance of generator(s), the ESM comprising: one or more batteries; and a controller configured to be operably coupled to the generator(s), each generator comprising an engine and a plurality of engine sensors and each engine being associated with engine specification data and baseline performance data, the controller being configured to execute a performance test with respect to a selected engine of the generator(s) by completing the following steps with respect to the selected engine: (a) accessing engine specification data and baseline performance data associated with a selected engine of one of the generator(s); (b) initiating, using the one or more batteries, a load step on the selected engine, the load step being based on the engine specification data associated with the selected engine; (c) receiving, from a plurality of sensors associated with the selected engine, data associated with a response of the selected engine to the load step of step (b); (d) comparing the data of step (c) to the baseline performance data associated with the selected engine; (e) calculating, based on the comparison of step (d), an engine performance score associated with a performance of the selected engine; and (f) storing the engine performance score of step (e) in a database associated with the controller. In one embodiment, the selected engine is a first engine of a first generator of the generator(s) and the engine performance score calculated for the selected engine is a first engine performance score associated with a performance of the first engine. In one embodiment, the controller completes the following additional steps with respect to the selected engine: (g) repeating the steps (b)-(f) such that the engine performance score calculated for the selected engine is a second engine performance score associated with the performance of the first engine; and (h) comparing the first engine performance score and the second engine performance score to detect a change in the performance of the first engine. In one embodiment, the controller completes the following additional steps with respect to the selected engine: (i) selecting, using the controller, a second engine of a second generator of the generator(s) such that the second engine is the selected engine; and (j) executing steps (a)-(f) such that the engine performance score calculated for the selected engine is a first engine performance score associated with a performance of the second engine. In one embodiment, the controller completes the following additional steps with respect to the selected engine: (k) comparing the first engine performance score associated with the performance of the first engine and the first engine performance score associated with the performance of the second engine; and (l) creating, based on the comparison of step (k), a sequencing order defining the order in which the first generator and the second generator will be brought online to generate power. In one embodiment, the comparison of step (k) indicates that the performance of the first engine is greater than the performance of the second engine; and the sequencing order of step (l) defines that the first generator will be brought online before the second generator. In one embodiment, step (a) further comprises accessing a digital twin associated with the first engine; the digital twin comprises the engine specification data and the baseline performance data associated with the first engine; and the digital twin is accessed from either a manufacturer database or the selected engine. In one embodiment, the controller completes the following additional step with respect to the selected engine: (m) receiving, by the one or more batteries of the ESM, a power output from the engine, the power output being associated with the response of the engine to the first load.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations and this is within the contemplated scope of disclosure herein, unless stated otherwise.

The phrase "at least one of A and B" should be understood to mean "A, B, or both A and B." The phrases "one or more of the following: A, B, and C" and "one or more of A, B, and C" should each be understood to mean "A, B, or C; A and B, B and C, or A and C; or all three of A, B, and C."

It is understood that variations may be made in the foregoing without departing from the scope of the present disclosure.

In several embodiments, one or more of the operational steps in each embodiment may be omitted. Moreover, in some instances, some features of the present disclosure may be employed without a corresponding use of the other features. Moreover, one or more of the embodiments disclosed above, or variations thereof, may be combined in whole or in part with any one or more of the other embodiments described above, or variations thereof.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method for generating power by bringing a plurality of generators online using a sequencing order and an energy storage module ("ESM"), the ESM comprising one or more batteries and a controller configured to be operably coupled to each of the plurality of generators, each of the plurality of generators comprising an engine associated with a plurality of engine sensors, engine specification data, and baseline performance data, and the method comprising:
   (a) accessing, using the controller, engine specification data and baseline performance data associated with a selected engine of one of the plurality of generators, wherein the selected engine is a first engine of a first generator of the plurality of generators;
   (b) initiating, using the controller and the one or more batteries, a load step on the selected engine, the load step being based on the engine specification data associated with the selected engine;
   (c) receiving, by the controller and from a plurality of sensors associated with the selected engine, data associated with a response of the selected engine to the load step of step (b);
   (d) comparing, using the controller, the data of step (c) to the baseline performance data associated with the selected engine;
   (e) calculating, using the controller and based on the comparison of step (d), an engine performance score associated with a performance of the selected engine, wherein the engine performance score calculated for the selected engine is a first engine performance score associated with a performance of the first engine;
   (f) storing, using the controller, the engine performance score of step (e) in a database associated with the controller;
   (g) selecting, using the controller, a second engine of a second generator of the plurality of generators such that the second engine is the selected engine;

(h) executing steps (a)-(f) with the second engine being the selected engine such that the engine performance score calculated for the selected engine is a first engine performance score associated with a performance of the second engine;
(i) comparing, using the controller, the first engine performance score associated with the performance of the first engine and the first engine performance score associated with the performance of the second engine;
(j) creating, using the controller and based on the comparison of step (i), a sequencing order defining the order in which the first generator and the second generator will be brought online to generate power; and
(k) generating power by bringing online, using the controller, the first generator and the second generator based on the sequencing order.

2. The method of claim 1, further comprising:
(l) identifying, using the controller and based on the first engine performance score, a future maintenance activity for the first engine.

3. The method of claim 1, further comprising:
(m) predicting, using the controller and based on the first engine performance score, a service life of the first engine.

4. The method of claim 1,
wherein step (a) further comprises accessing a digital twin associated with the first engine; and
wherein the digital twin comprises the engine specification data and the baseline performance data associated with the first engine.

5. The method of claim 1, further comprising:
(n) repeating the steps (b)-(f) with the first engine being the selected engine such that the engine performance score calculated for the selected engine is a second engine performance score associated with the performance of the first engine; and
(o) comparing, using the controller, the first engine performance score associated with the performance of the first engine and the second engine performance score associated with the performance of the first engine to detect a change in the performance of the first engine.

6. The method of claim 1,
wherein the comparison of step (i) indicates that the performance of the first engine is greater than the performance of the second engine; and
wherein the sequencing order of step (j) defines that the first generator will be brought online before the second generator.

7. The method of claim 6,
wherein the performance of the first engine is the fuel efficiency of the first engine and the performance of the second engine is the fuel efficiency of the second engine; and
wherein the sequencing order of step (j) is created such that the more fuel efficient engine of the first and second engines is ordered to be brought online first in order to reduce the amount of fuel used by the plurality of generators.

8. The method of claim 1, further comprising:
(p) repeating the steps (b)-(f) with the first engine being the selected engine such that the engine performance score calculated for the selected engine is a second engine performance score associated with the performance of the first engine;
(q) repeating the steps (b)-(f) with the second engine being the selected engine such that the engine performance score calculated for the selected engine is a second engine performance score associated with the performance of the second engine;
(r) comparing, using the controller, the second engine performance score associated with the performance of the first engine and the second engine performance score associated with the performance of the second engine; and
(s) updating, using the controller and based on the comparison of step (r), the sequencing order of step (j) defining the order in which the first generator and the second generator will be brought online to generate power.

9. The method of claim 8,
wherein the comparison of step (r) indicates that the performance of the second engine is greater than the performance of the first engine; and
wherein the updated sequencing order of step (s) defines that the second generator will be brought online before the first generator.

10. An energy storage module ("ESM") capable of testing engine performance of a plurality of generators and bringing the plurality of generators online, the ESM comprising:
one or more batteries; and
a controller configured to be operably coupled to the each of the plurality of generators, each generator of the plurality of generators comprising an engine and a plurality of engine sensors and each engine being associated with engine specification data and baseline performance data, the controller being configured to execute a performance test with respect to a selected engine of the plurality of generators by completing the following steps with respect to the selected engine:
a) accessing engine specification data and baseline performance data associated with the selected engine of one of the plurality of generators, wherein the selected engine is a first engine of a first generator of the plurality of generators;
(b) initiating, using the one or more batteries, a load step on the selected engine, the load step being based on the engine specification data associated with the selected engine;
(c) receiving, from a plurality of sensors associated with the selected engine, data associated with a response of the selected engine to the load step of step (b);
(d) comparing the data of step (c) to the baseline performance data associated with the selected engine;
(e) calculating, based on the comparison of step (d), an engine performance score associated with a performance of the selected engine, wherein the engine performance score calculated for the selected engine is a first engine performance score associated with a performance of the first engine;
(f) storing the engine performance score of step (e) in a database associated with the controller
(g) selecting a second engine of a second generator of the plurality of generators such that the second engine is the selected engine;
(h) executing steps (a)-(f) with the second engine being the selected engine such that the engine performance score calculated for the selected engine is a first engine performance score associated with a performance of the second engine;
(i) comparing the first engine performance score associated with the performance of the first engine and the first engine performance score associated with the performance of the second engine;

(j) creating, based on the comparison of step (i), a sequencing order defining the order in which the first generator and the second generator will be brought online to generate power; and (k) generating power by bringing online, using the controller, the first generator and the second generator based on the sequencing order.

11. The ESM of claim 10, wherein the controller completes the following additional steps with respect to the selected engine:

(l) repeating the steps (b)-(f) with the first engine being the selected engine such that the engine performance score calculated for the selected engine is a second engine performance score associated with the performance of the first engine; and (m) comparing the first engine performance score associated with the performance of the first engine and the second engine performance score associated with the performance of the first engine to detect a change in the performance of the first engine.

12. The ESM of claim 10, wherein the comparison of step (i) indicates that the performance of the first engine is greater than the performance of the second engine; and wherein the sequencing order of step (i) defines that the first generator will be brought online before the second generator.

13. The ESM of claim 10, wherein step (a) further comprises accessing a digital twin associated with the selected engine;

wherein the digital twin comprises the engine specification data and the baseline performance data associated with the selected engine; and wherein the digital twin is accessed from either a manufacturer database or the selected engine.

14. The ESM of claim 10, wherein the controller completes the following additional step with respect to the selected engine:

(n) receiving, by the one or more batteries of the ESM, a power output from the selected engine, the power output being associated with the response of the selected engine to the first load.

15. A method for using an energy storage module ("ESM") in servicing at least one of a plurality of engines, the ESM comprising one or more batteries and a controller configured to be operably coupled to a plurality of generators, each generator of the plurality of generators comprising an engine of the plurality of engines, each engine of each respective generator being associated with a plurality of engine sensors, engine specification data, and baseline performance data, and the method comprising:

(a) accessing, using the controller, engine specification data and baseline performance data associated with a selected engine of one of the plurality of generators, wherein the selected engine is a first engine of a first generator of the plurality of generators;

(b) initiating, using the controller and the one or more batteries, a load step on the selected engine, the load step being based on the engine specification data associated with the selected engine;

(c) receiving, by the controller and from a plurality of sensors associated with the selected engine, data associated with a response of the selected engine to the load step of step (b);

(d) comparing, using the controller, the data of step (c) to the baseline performance data associated with the selected engine;

(e) calculating, using the controller and based on the comparison of step (d), an engine performance score associated with a performance of the selected engine, wherein the engine performance score calculated for the selected engine is a first engine performance score associated with a performance of the first engine;

(f) storing, using the controller, the engine performance score of step (e) in a database associated with the controller;

(g) identifying, using the controller and based on the first engine performance score associated with the performance of the first engine, a future maintenance activity for the first engine; and (h) performing maintenance on the first engine based on the future maintenance activity identified in step (g).

16. The method of claim 15, further comprising:

(i) predicting, using the controller and based on the first engine performance score, a service life of the first engine.

17. The method of claim 15, wherein step (a) further comprises accessing a digital twin associated with the first engine; and wherein the digital twin comprises the engine specification data and the baseline performance data associated with the first engine.

18. The method of claim 15, further comprising:

(j) repeating the steps (b)-(f) with the first engine being the selected engine and after the maintenance has been performed on the first engine such that the engine performance score calculated for the selected engine is a second engine performance score associated with the performance of the first engine; and (k) comparing the first engine performance score associated with the performance of the first engine and the second engine performance score associated with the performance of the first engine to detect a change in the performance of the first engine after the maintenance has been performed on the first engine.

19. The method of claim 15, further comprising:

(l) selecting, using the controller, a second engine of a second generator of the plurality of generators such that the second engine is the selected engine;

(m) executing steps (a)-(f) with the second engine being the selected engine such that the engine performance score calculated for the selected engine is a first engine performance score associated with a performance of the second engine;

(n) identifying, using the controller and based on the first engine performance score associated with the performance of the second engine, a future maintenance activity for the second engine; and (o) performing maintenance on the second engine based on the future maintenance activity identified in step (n).

20. The method of claim 19, further comprising:

(p) comparing the first engine performance score associated with the performance of the first engine and the first engine performance score associated with the performance of the second engine;

(q) creating, based on the comparison of step (p), a sequencing order defining the order in which the first generator and the second generator will be brought online to generate power; and (r) generating power by bringing online, using the controller, the first generator and the second generator based on the sequencing order.

* * * * *